United States Patent Office 3,703,550
Patented Nov. 21, 1972

3,703,550
PROCESS FOR PREPARING UNSATURATED ALDEHYDES AND UNSATURATED CARBOXYLIC ACIDS
Mamoru Nakano and Koju Kadowaki, Amimachi, Isao Komuro, Yokkaichi, and Takeo Koshikawa and Bunzi Oshida, Amimachi, Japan, assignors to Mitsubishi Petrochemical Co., Ltd., Tokyo, Japan
No Drawing. Continuation-in-part of abandoned application Ser. No. 699,307, Jan. 22, 1968. This application Dec. 29, 1970, Ser. No. 102,501
Int. Cl. C07c 51/32, 57/04
U.S. Cl. 260—533 N
4 Claims

ABSTRACT OF THE DISCLOSURE

In the process for preparing unsaturated compounds selected from unsaturated aldehydes and unsaturated carboxylic acids which comprises contacting an α-olefin in the vapor phase with molecular oxygen at a temperature of 250–550° C. in the presence of a solid catalyst, the improvement wherein the solid catalyst consists essentially of the elements of (i) molybdenum, (ii) tin, (iii) phosphorus, (iv) tellurium, (v) iron and (vi) oxygen, said elements (i) to (v) being present in the catalyst in an atomic ratio expressed by the following formula:

$$(Mo)_{12}(Te)_a(P)_b(Sn)_c(Fe)_d$$

wherein $a$ is from 0.2 to 12, $b$ is from 0.2 to 24, $c$ is from 0.2 to 24, and $d$ is from 0.2 to 24.

This application is a continuation-in-part of the application Ser. No. 699,307, now abandoned.

This invention relates to a process for preparing unsaturated aldehydes and unsaturated carboxylic acids by the gas phase catalytic oxidation of α-olefins. More specifically it relates to a process for preparing unsaturated aldehydes and unsaturated carboxylic acids from α-olefins with use of catalysts exhibiting high selectivity for the unsaturated aldehydes and carboxylic acids and being capable of retaining high catalytic activity for a long time with less reduction in activity.

It is known to prepare acrylic acid or acrolein by the gas phase catalytic oxidation of propylene. It is also known in the art that in order to work this oxidation advantageously on an industrial scale it is first of all important that catalysts to be used should be excellent.

As the catalysts used for preparing acrylic acid by the oxidation of propylene, the specification of British Pat. No. 822,140 proposes one comprising molybdenum tin and phosphorus. However, the conversion of propylene is generally low with this catalyst, and if the conversion of propylene is increased, formation of by-products such as carbon monoxide becomes great and therefore, it is difficult to increase the yield of acrylic acid.

The specification of U.S. Pat. No. 3,456,004 discloses a method of oxidizing α-olefins such as propylene to corresponding aldehydes or carboxylic acids with use of a catalyst having a composition of the formula $$Mo_{10}Te_{1-10}Sn_{2-20}P_{2-20}O_{39-120}$$

in which the P/Sn ratio is in the range of 2–3/4. This catalyst is satisfactory in that at the initial stage of the reaction it gives the aldehyde or carboxylic acid in a high selectivity. However, catalysts of this type are generally low in their activity. Accordingly, in case the industrial-scale oxidation is conducted with use of such catalysts, it is necessary to separate the unreacted olefin from the reaction product and recycle it to the reaction zone. Further, these catalysts are defective in that in order to obtain the intended product in high yield it is necessary to greatly prolong the contact time. Still in addition, under conditions accelerating the reaction speed, such as high reaction temperatures and high olefin partial pressures, their life is extremely shortened and the selectivity of the intended aldehyde or carboxylic acid is lowered for a short period of time.

In the oxidation of olefins, with a view to improving the selectivity and avoiding the explosion, steam is generally made co-present with air as the oxygen source. In this case, the higher the olefin concentration in the starting material gas, the higher the space hourly yield of the intended product. Further, at a high olefin concentration, the recovery of the product can be accomplished with ease, which results in economical advantages. When the above-mentioned molybdenum-tellurium catalyst is used in such oxidation procedures, though its activity is excellent at the initial stage, deactivation of the catalyst is caused to occur with the lapse of time, with the consequence that it is not fit for a long-time operation. Again in the above oxidation reaction, in view of the pressure loss in the system of recovery of the product, the reaction is generally conducted under pressure unless special operational means is adopted. It has been found that in case the reaction is conducted under pressure, the deactivation of the catalyst of the above type is further promoted.

In view of the foregoing, research has been conducted on the deactivation of molybdenum-tellurium catalysts, and it has been found that the deactivation of the catalyst is due to the reduction of the catalyst and that when tellurium oxide in the catalyst is reduced to metallic tellurium, it is sublimated, with the result that the tellurium component escapes from the catalyst and it is deactivated.

With a view to solving this new problem of increasing the resistance of the catalyst against reduction, it has been found that when molybdenum tellurium catalysts of a specific composition as described below are incorporated with a specific amount of an iron component, the reduction resistance of the catalysts can be highly improved and they can give unsaturated aldehydes and unsaturated carboxylic acids in high yields, even if the oxidation is conducted for a very long time, with no reduction of yields.

In accordance with this invention, an improvement of the process for the preparation of unsaturated compounds selected from the group consisting of α,β-unsaturated aldehydes and α,β-unsaturated carboxylic acids is provided which comprises contacting an α-olefin in the vapor phase with molecular oxygen at a temperature of 250–550° C. in the presence of a solid catalyst, the improvement being characterized in that the solid catalyst consists essentially of the elements of (i) molybdenum, (ii) tin, (iii) phosphorus, (iv) tellurium, (v) iron and (vi) oxygen, elements (i) to (v) being present in the catalyst is an atomic ratio expressed by the following formula:

$$(Mo)_{12}(Te)_a(P)_b(Sn)_c(Fe)_d$$

in which $a$ is from 0.2 to 12, $b$ is from 0.2 to 24, $c$ is from 0.2 to 24, and $d$ is from 0.2 to 24.

In the catalyst to be used in this invention, the above quantitative ratio of the indispensable components of molybdenum, tin, phosphorus, tellurium and iron is critical. For instance, in the catalyst free of the iron component, as illustrated in examples given hereinbelow, the tellurium component escapes from the catalyst during use and the selectivity of the intended unsaturated aldehyde and carboxylic acid is abruptly lowered during the reaction. In the case of a catalyst containing the iron component in too great an amount, the selectivity of the intended unsaturated aldehyde and carboxylic acid is generally low. Accordingly, it is particularly important that the iron component is present in the above ratio in the catalyst.

When the tellurium component is present in the catalyst is an amount below the above range, there is a decline of the conversion of the starting α-olefin as well as a decline of the selectivity of the unsaturated aldehyde and carboxylic acid. On the other hand, when the tellurium component is present in an amount exceeding the above range, the activity of the catalyst decreases. In case the tin component is present in an amount less than the above range, a decline in conversion of the starting α-olefin is caused to occur, and in case the tin component is present in an amount exceeding the above range, the oxidation of the α-olefin advances to an excessive degree and for this reason it is difficult to recover the desired aldehyde and acid in high yields. From the same standpoint it is preferred that the phosphorus-to-tin atomic ratio (P/Sn) is greater than 1. In case the proportion of phosphorus is too great, it tends to form a low melting point compound together with molybdenum, resulting in degradation of the activity of the catalyst. Thus, in the catalyst to be used in the process of this invention it is desired that the atomic ratio of phosphorus to tin is within the range of $10 > P/Sn > 1$.

In this invention it is preferred that the gram-atom number of phosphorus plus tellurium is substantially equal to, or less than, the gram-atom number of molybdenum plus tin. In case the gram-atom number of the former is within a range substantially exceeding the gram-atom number of the latter, an undesired tendency that the catalyst activity is low appears or the catalyst is abruptly degraded during use.

Since the essential components of the catalyst to be used in this invention are those of the elements of molybdenum, tin, phosphorus, tellurium, iron and oxygen, it can be prepared by customary procedures adopted in the preparation of solid catalysts of this type, there being no particular limitation other than the requirement that the elements of molybdenum, tin, phosphorus, tellurium and iron should be present in an atomic ratio of the above-mentioned specific range.

Accordingly, the catalyst can be prepared readily, for instance, by a method comprising evaporating to dryness a solution or suspension, particularly an aqueous solution, in which the elements of molybdenum, tin, phosphorus, tellurium and iron or compounds thereof, particularly compounds of these elements capable of being decomposed and converted to oxides at the catalyst calcination temperatures of 400–600° C. are dissolved or suspended and calcining the resulting powdery solid in the air at temperatures of 400–600° C. When the calcination is effected at a temperature exceeding 600° C., catalyst components are caused to sublime, resulting in a marked decline in the catalyst activity. On the other hand, when the calcination is conducted at a temperature below 400° C., an undesired tendency that the catalyst activity is unstable appears.

Depending on the object of use, the catalyst may be molded into tablet or other small aggregate forms before or after the calcination, or it may be ground into a powdery form after the calcination.

As compounds of molybdenum, tin, phosphorus, tellurium and iron which are decomposed at catalyst calcination temperatures of 400–600° C. to oxides thereof, there may be cited molybdic acid and molybdates as molybdenum compounds, tin halides as tin compounds, telluric acid and tellurium oxide as tellurium compounds, phosphoric acid and phosphorus oxides as phosphorus compounds, and ferric nitrate, ferrous nitrate, ferric chloride and ferrous chloride as iron compounds.

Such substances as nitric acid, oxalic acid, hydrochloric acid, ammonia and amines, which do not appreciably remain in the catalyst when it is calcined in the air at a temperature exceeding 400° C. may also be added to the solution, particularly the aqueous solution, of the elements of molybdenum, tin, phosphorus, tellurium and iron. The addition of such substances makes it possible to adjust the surface area of the resulting catalyst to some extent and to thereby give good influences to the activity and selectivity of the catalyst.

Catalysts of the above type to be used in this invention may be used in the as-obtained form, or their activity and selectivity can be improved or their mechanical strength and thermal stability can be enhanced, by supporting them on optional carriers customarily used in solid oxidation catalysts of this type, such as silica, alumina, diatomaceous earth, silicon carbide (Carborundum), titanium oxide, zirconium oxide, and pumice. However, catalysts of this invention are, in general, preferably used in the as-obtained powdery or tablet form without use of such carrier.

In addition to the essential components of molybdenum, tin, phosphorus, tellurium and iron, the catalyst to be used in this invention may contain a silicon component. The catalyst of this type has the atomic ratio of the above elements expressed by the following formula:

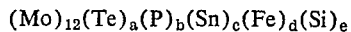

$$(Mo)_{12}(Te)_a(P)_b(Sn)_c(Fe)_d(Si)_e$$

wherein $a$ is from 0.2 to 12, $b$ is from 0.2 to 24, $c$ is from 0.2 to 24, $d$ is from 0.2 to 24, and $e$ is from 0.2 to 100.

The catalyst of this type may be obtained, for instance, by a method comprising mixing an aquasol or hydrogel of silica or an amorphous activated silica with oxides of molybdenum, tin, phosphorus, tellurium and iron or compounds of these elements capable of giving the oxides at calcination temperatures of 400–600° C., and thereafter calcining the mixture at a temperature of 400–600° C. Since the catalyst of this type containing the silicon component has a very high catalytic activity, the activity of the catalyst may be controlled optionally over a broad range by adjusting the calcination temperature. Accordingly, a variety of catalysts meeting various requirements can be readily produced. Another advantage of the catalyst of this type is that supporting of the catalyst on a carrier may be accomplished with great ease. When the silicon component is introduced in the catalyst in the form of an aquasol or hydrogel or an amorphous activated silica, a catalyst can be obtained giving excellent selectivity and yield of the intended aldehyde and acid and having excellent abrasion resistance and break strength.

The amorphous activated silica used in the catalyst of this type of this invention is meant to be silica which has not been heated at a temperature exceeding 700° C. Accordingly, this amorphous silica is characterized by a relatively great surface area (generally more than 100 m.²/g). In this point, the above amorphous silica is distinguished from a silica carrier of a small surface area customarily used as a carrier for a solid oxidation catalyst.

The preparation of the catalyst of this type containing the silicon component may be conducted under the same conditions as described with respect of the catalyst of the first type free of the silicon component, except that an aquasol or hydrogel of silica or an amorphous activated silica is additionally used as the starting material. The catalyst of this type may be conveniently used either in the as-obtained powdery or tablet form, or in the form supported on a carrier such as described hereinabove.

It has not been completely elucidated in what forms the molybdenum, tin, tellurium, iron, phosphorus and oxygen are present, or these elements and silicon, in the above-mentioned catalyst to be used in this invention. However, though it is believed that the essence of this invention is not at all influenced by such microscopical factor, generally speaking, it is presumed that they are present in the form of a mixture of oxides of molybdenum, tin, phosphorus, tellurium and iron optionally with silicon oxide, or in the form of a mixture of compounds resulting from the interreaction of some of these components.

The catalyst of this invention may contain as an additional catalyst component at least one member selected from the group consisting of manganese, tungsten, chromium and nickel. Even in the case of a catalyst containing such additional component, the advantage of this invention that the degradation of the activity is not observed even after a longtime use is fully retained. With use of such catalyst it is possible to adjust the proportion of the resulting aldehyde and acid to a desired value by selecting a suitable combination of such additional components.

In the process of this invention, the vapor phase catalytic oxidation of an $\alpha$-olefin is conducted under substantially the same conditions as adopted conventionally in the art, except that the above-mentioned specific catalyst is used. As the $\alpha$-olefin those of 3 to 4 carbon atoms, especially propylene and isobutylene may be used.

Molecular oxygen and an $\alpha$-olefin are contacted with each other at a temperature of 250–550° C., preferably 300–450° C. in a fixed or fluidized bed of the above-mentioned catalyst.

At a temperature below 250° C., the conversion of the $\alpha$-olefin is low, whereas at a temperature exceeding 550° C., the successive oxidation of the intended acid or aldehyde will result in increase of by-products such as carbon monoxide and in decrease of the yield of the intended product.

As the reaction gas, a gaseous mixture of an $\alpha$-olefin and molecular oxygen may be used, but it is also possible to use a diluent inert under the reaction conditions, such as nitrogen, argon, steam and carbon dioxide gas. Use of nitrogen and steam a diluent is particularly advantageous in the process of this invention. In view of the fact that the air is used as oxygen source, use of nitrogen as a diluent is of great importance from the commercial standpoint. Use of steam is also of great importance in that the presence of steam prevents the complete oxidation of the aldehyde and acid and the polymerization of the resulting aldehyde and acid, and that recovery of the resulting aldehyde and acid is facilitated by the presence of steam.

When the process is conducted on an industrial scale, it is advantageous to use air as the oxygen source with steam copresent in the reaction gas comprising an $\alpha$-olefin and air so as to avoid the explosion and improve the selectivity. As long as the critical point of explosion is avoided, the composition of the reaction gas may be optionally chosen, but it is preferable to use a gaseous mixture in which the molar ratio of $O_2$ to the olefin is from 1 to $10^1$, and the molar ratio of $H_2O$ to the olefin is from 2 to $20^1$.

The contact time may be optionally chosen depending on the type of product desired, but it is generally preferred that the contact time is within a range of from 0.5 to 30 seconds. The reaction pressure is not critical in this invention, but it is preferred that the pressure is within a range of from 0 to 5 kg./cm.$^2$·G. Under such conditions, the higher the reaction temperature, or the longer the contact time, the greater the ratio of the acid to the aldehyde in the resulting reaction mixture. Accordingly, the reaction conditions may be suitably adjusted depending on the type of product desired.

The reaction product gas is cooled and washed with a suitable medium such as water or other solvent to dissolve the resulting aldehyde and acid therein. Thus, the intended aldehyde and acid are recovered.

The most characteristic feature of the catalyst of this invention resides in that in converting $\alpha$-olefins to unsaturated aldehydes and/or unsaturated carboxylic acids, decline of the selectivity and yield of the aldehydes and/or carboxylic acids does not appreciably occur even when the catalyst is used continuously for a long time.

In general, the life of the catalyst is determined by conducting tthe continuous operation for a long time. As described hereinabove, it has been confirmed that the deactivation of the molybdenum-tellurium catalyst is due to the reduction of the catalyst. It has also been found that the life of the catalyst used on industrial scale may be anticipatively determined with ease by conducting a model experiment in which the catalyst is subjected to the reduction treatment, and examining the degradation of the activity and comparing the physical properties of the catalyst after the reduction treatment with those of the catalyst before the reduction treatment. As is seen from examples given hereinbelow, the results of such model experiment conform precisely to the results of the actual long-time operation.

This invention will now be detailed hereinbelow by referring to examples, in which the values of selectivity and conversion were calculated according to the following formulas:

Selectivity of acrolein (percent)

$$= \frac{\text{(moles of acrolein produced)}}{\left(\begin{array}{c}\text{moles of} \\ \text{propylene fed}\end{array} - \begin{array}{c}\text{moles of} \\ \text{unreacted propylene}\end{array}\right)} \times 100$$

Selectivity of acrylic acid (percent)

$$= \frac{\text{(moles of acrylic acid produced)}}{\left(\begin{array}{c}\text{moles of} \\ \text{propylene fed}\end{array} - \begin{array}{c}\text{moles of} \\ \text{unreacted propylene}\end{array}\right)} \times 100$$

Conversion of propylene (percent)

$$= \frac{\left(\begin{array}{c}\text{moles of} \\ \text{propylene fed}\end{array} - \begin{array}{c}\text{moles of} \\ \text{unreacted propylene}\end{array}\right)}{\text{(moles of propylene fed)}} \times 100$$

EXAMPLE 1

This example illustrates the preparation of a catalyst free of iron and the oxidation of propylene with use of such catalyst.

32 ml. of concentrated nitric acid were added to 8.05 g. of metallic tellurium to oxidize the same. A solution of 88.3 g. of ammonium molybdate dissolved in 480 ml. of water was added under agitation to the oxide solution. To the mixture were added an aqueous solution of 8.1 g. of manganese carbonate and 44.9 g. of ammonium paratungstate dissolved in 835 ml. of water. Then the mixture was agitated sufficiently, and then a solution of 31.35 g. of stannous chloride dissolved in 43 ml. of water, 15.0 ml. of 85% phosphoric acid and 61.0 g. of silica sol (sold under trade name "Snowtex N") were added to the mixture. Then the resulting mixture was sufficiently agitated and evaporated to dryness on a hot water bath. The resulting solid was ground to about 100 mesh and calcined at 430° C. in the air for 3 hours. The resulting calcined catalyst powder was blended with 1% by weight of graphite, molded into tablets of 4 mm. diameter and 4 mm. height, and calcined at 540° C. in air for 5 hours. The atomic ratio of Mo:Te:P:Sn:Mn:W:Si in the resulting catalyst was 12:1.5:5.3:3.2:2:4:5. The so obtained catalyst was packed in a stainless steel reaction tube of 15 mm. inner diameter, and through this tube a gas consisting of 4.0 volume percent of propylene, 50 volume percent of air and 46 volume percent of water under atmospheric pressure was passed for a contact time of 9 seconds on a bath maintained at 390° C. The conversion of propylene was 91.5%, the selectivity of acrolein being 75.0% and the selectivity of acrylic acid being 13.0%.

EXAMPLE 2

This example shows the results of the run where the oxidation of propylene was continued for a long time with use of a catalyst free of iron.

The catalyst prepared in Example 1 was packed in a stainless steel reaction tube of 15 mm. inner diameter, and the oxidation was continued for a long time under the conditions indicated below.

Gas composition: 4.0 volume percent of propylene, 51.0 volume percent of air and 45.0 volume percent of water
Reaction pressure: 2.5 atmospheres
Bath temperature: 375–380° C.
Contact time: 8–9 seconds The results are shown in Table 1.

TABLE 1

|  | Conversion of propylene (percent) | Selectivity of acrolein plus acrylic acid (percent) |
|---|---|---|
| Initial stage of reaction | 91.2 | 85.0 |
| 30 days after initiation of reaction | 90.0 | 67.0 |

As is seen from the above results, when the oxidation is conducted under pressurizing conditions as above with use of an iron-free catalyst for a long time, decline of either the conversion of propylene or the selectivity of acrolein plus acrylic acid occurs and the deactivation of the catalyst is observed.

After the above continuous operation, the catalyst was taken from the reaction tube and the escape ratio of tellurium was measured to be 12%. The values of the escape ratio of tellurium were calculated according to the following formula:

Escape ratio of tellurium (%)
$$= \frac{(\text{tellurium content in catalyst before reaction}) - (\text{tellurium content in catalyst after reaction})}{(\text{tellurium content in catalyst before reaction})} \times 100$$

By the X-ray diffraction pattern analysis it was confirmed that the diffraction intensity of $MoO_3$ in the catalyst after the reaction was about ⅓ of that of the catalyst before the reaction.

EXAMPLE 3

With a view to anticipating by a short time experiment the life of the catalyst when used in the oxidation under pressurizing conditions such as in Example 2, the following experiment was contrived and conducted.

5 ml. of a sample catalyst were mixed and diluted with 15 ml. of Raschig ring, and the mixture was packed in a stainless steel reaction tube of 15 mm. inner diameter, through which a gas consisting of 4.0 volume percent of propylene, 56 volume percent of air and 40 volume percent of water and having an oxygen-to-propylene molar ratio of 2.9 was passed for a contact time of 2.2 seconds on a bath maintained at 410° C. The above reaction is referred to as "standard reaction."

Then, a gas consisting of 8.0 volume percent of propylene, 47 volume percent of air and 45 volume percent of water and having an oxygen-to-propylene molar ratio of 1.1 was passed through the above reaction tube for 3 or 5 hours while the contact time and the bath temperature were maintained as above. This procedure is referred to as "reduction treatment." Then, the standard reaction was conducted again. The reactivity of the catalyst was compared with that before the reduction treatment, and the catalyst was taken from the reaction tube and changes of properties of the catalyst by the reduction treatment were examined.

The results of the above model experiment using the catalyst prepared in Example 1 are shown in Table 2.

TABLE 2

|  | Conversion of propylene (percent) | Selectivity of acrolein plus acrylic acid (percent) |
|---|---|---|
| Standard reaction before reduction treatment | 60.5 | 93.2 |
| Standard reaction after reduction treatment | 59.5 | 85.0 |

Thus it is seen that decrease of the selectivity was brought about by the above reduction treatment.

The catalyst was taken from the reaction tube and the escape ratio of tellurium was measured to be 20%. By the X-ray diffraction pattern analysis it was confirmed that the diffraction intensity of $MoO_3$ of the catalyst after the above model experiment was about ⅓ of that of the catalyst before the model experiment.

Thus it is seen that the results of the above model experiment conformed well to the results of the continuous run of Example 2 conducted under pressurizing conditions.

EXAMPLES 4–10

These examples are given to explain prominent improvements attained by addition of iron as the catalyst component.

Catalysts having a composition indicated in Table 3 were prepared in the same manner as in Example 1, and with use of these catalysts model experiments were conducted according to Example 3. Results are shown in Table 3.

In the preparation of catalysts of Examples 6 to 10, ferric nitrate was used as the starting material of the iron component. In the preparation of the catalyst of Example 8, nickel nitrate was used as the starting material of the nickel component, and in the preparation of the catalyst of Example 9, chromium nitrate was used as the starting material of the chromium component.

TABLE 3

| Catalyst composition | Before reduction treatment | | After reduction treatment | | Escape ratio of tellurium (percent) |
|---|---|---|---|---|---|
|  | Conversion of propylene (percent) | Selectivity of acrolein plus acrylic acid (percent) | Conversion of propylene (percent) | Selectivity of acrolein plus acrylic acid (percent) |  |
| Example No.: |  |  |  |  |  |
| 4 ... Mo:Te:P:Sn:Si=12:1.5:5.3:3.2:5.0 | 86.1 | 85.3 | 85.0 | 80.2 | 12 |
| 5 ... Mo:Te:P:Sn:Mn:Si=12:1.5:5.3:1.9:2.5 | 86.0 | 81.4 | 82.5 | 77.0 | 30 |
| 6 ... Mo:Te:P:Sn:Fe:Si=17:2:8:3:5:5 | 47.2 | 89.8 | 48.7 | 90.0 | 0 |
| 7 ... Mo:Te:P:Sn:Fe:W:Si=12:1.5:6:2.25:2:4:5 | 72.0 | 92.0 | 72.5 | 91.5 | 0 |
| 8 ... Mo:Te:P:Sn:Fe:Ni:Si=12:2:8:3:4:1:5 | 55.4 | 82.5 | 58.5 | 82.5 | 0 |
| 9 ... Mo:Te:P:Sn:Fe:Cr:Si=12:2:8:3:4:1:5 | 64.3 | 85.6 | 63.5 | 87.3 | 0 |
| 10 ... Mo:Te:P:Sn:Fe:Mn:Si=12:2:8:3:4:1:5 | 61.9 | 88.4 | 59.7 | 88.2 | 0 |

EXAMPLE 11

This example is given to show that the results of model experiments of Examples 4 to 10 conform exactly to the results of the long-time continuous operation.

With use of the catalyst of Example 7, the long-time continuous operation of the oxidation of propylene was conducted under the same pressurizing conditions as in Example 2. Results are shown in Table 4.

TABLE 4

|  | Conversion of propylene (percent) | Selectivity of acrolein plus acrylic acid (percent) |
|---|---|---|
| Initial stage of reaction | 87.0 | 85.0 |
| 30 days after initiation of reaction | 88.0 | 83.5 |

After the continuous operation, the catalyst was taken from the reaction tube. No change in properties of the catalyst was observed.

EXAMPLE 12

Aqueous solutions of ammonium molybdate, stannous chloride, phosphoric acid and ferrous nitrate, an aqua regia solution of tellurium, and colloidal silica were mixed so that the atomic ratio of Mo:Sn:P:Te:Fe:Si would be 12:1:4:1:1:5.9. The mixture was then evaporated to dryness under agitation, calcined at 450° C. in air for 6 hours, compression molded into tablets and again calcined at 550° C. in air for 4 hours. The oxidation of propylene was conducted with use of the so obtained catalyst under conditions indicated in Table 5. As the reactor a quartz reactor having an inner diameter of 28 mm. was used. The composition of the starting gas was 3 volume percent of propylene, 76 volume percent of air and 21 volume percent of steam. Results are shown in Table 5.

TABLE 5

| | |
|---|---|
| Contact time (second) | 7.2 |
| Reaction temperature (° C.) | 425 |
| Conversion of propylene (percent) | 97.5 |
| Selectivity (percent): | |
| Acrylic acid | 47.1 |
| Acrolein | 37.7 |
| Acetic acid | 1.9 |

EXAMPLE 13

A gas consisting of 4.0 volume percent of propylene, 50 volume percent of air and 46 volume percent of water was passed through a reactor packed with the catalyst of Example 6 for a contact time of 4.5 seconds under atmospheric pressure on a bath maintained at 410° C. Propylene was reacted at a conversion of 65.8%, and acrolein was obtained at a selectivity of 79.5% and acrylic acid was obtained at a selectivity of 9.8%.

EXAMPLE 14

A catalyst having an atomic ratio of

Mo:Te:P:Sn:Fe:Si=12:1:6:2:2:28 was prepared in the same manner as in Example 6. A gas consisting of 5.0 volume percent of isobutylene, 66.7 volume percent of air and 28.3 volume percent of water was passed through a reactor packed with the so prepared catalyst for a contact time of 4 seconds on a bath maintained at 390° C. As a result, isobutylene was reacted at a conversion of 80% and the selectivity of methacrolein plus methacrylic acid was 59.0%.

What we claim is:

1. In the process for preparing unsaturated compounds selected from unsaturated aldehydes and unsaturated carboxylic acids which comprises contacting an α-olefin in the vapor phase with molecular oxygen at a temperature of 250–550° C. in the presence of a solid catalyst, the improvement wherein the solid catalyst consists essentially of the elements of (i) molybdenum, (ii) tin, (iii) phosphorus, (iv) tellurium, (v) iron and (vi) oxygen, said elements (i) to (v) being present in the catalyst in an atomic ratio expressed by the following formula:

$$(Mo)_{12}(Te)_a(P)_b(Sn)_c(Fe)_d$$

wherein $a$ is from 0.2 to 12, $b$ is from 0.2 to 24, $c$ is from 0.2 to 24, and $d$ is from 0.2 to 24.

2. The improvement set forth in claim 1 wherein the atomic ratio of phosphorus to tin is within the range of $10 > P/Sn > 1$.

3. In the process for preparing unsaturated compounds selected from unsaturated aldehydes and unsaturated carboxylic acids which comprises contacting an α-olefin in the vapor phase with molecular oxygen at a temperature of 250–550° C. in the presence of a solid catalyst, the improvement wherein the solid catalyst consists essentially of the elements of (i) molybdenum, (ii) tin, (iii) phosphorus, (iv) tellurium, (v) iron, (vi) silicon and (vii) oxygen, said elements (i) to (vi) being present in the catalyst in an atomic ratio expressed by the following formula:

$$(Mo)_{12}(Te)_a(P)_b(Sn)_c(Fe)_d(Si)_e$$

wherein $a$ is from 0.2 to 12, $b$ is from 0.2 to 24, $c$ is from 0.2 to 24, $d$ is from 0.2 to 24, and $e$ is from 0.2 to 100.

4. In the process for preparing unsaturated compounds selected from unsaturated aldehydes and unsaturated carboxylic acids which comprises contacting a α-olefin in the vapor phase with molecular oxygen at a temperature of 250–550° C. in the presence of a solid catalyst, the improvement wherein said solid catalyst consists essentially of the elements of (i) molybdenum, (ii) tin, (iii) phosphorus, (iv) tellurium, (v) iron, (vi) silicon, (vii) a metal selected from the group consisting of manganese, chromium and nickel, and (viii) oxygen, said elements (i) to (vii) being present in the catalyst in an atomic ratio expressed by the following formula:

$$(Mo)_{12}(Te)_a(P)_b(Sn)_c(Fe)_d(Si)_e(M)_f$$

wherein M is a metal selected from the group consisting of manganese, chromium and nickel, $a$ is from 0.2 to 12, $b$ is from 0.2 to 24, $c$ is from 0.2 to 24, $d$ is from 0.2 to 24, $e'$ is from 0 to 100, and $f$ is from 0.1 to 24.

References Cited

UNITED STATES PATENTS

| | | | |
|---|---|---|---|
| 3,192,259 | 6/1965 | Fetterley et al. | 260—533 N |
| 3,492,247 | 1/1970 | Eden | 260—533 N |

FOREIGN PATENTS

| | | | |
|---|---|---|---|
| 1,086,523 | 10/1967 | Great Britain | 260—533 N |
| 9,804 | 5/1967 | Japan | 260—533 N |
| 13,725 | 6/1968 | Japan | 260—533 N |

LORRAINE A. WEINBERGER, Primary Examiner

R. D. KELLY, Assistant Examiner

U.S. Cl. X.R.

252—437; 260—604 R

UNITED STATES PATENT OFFICE
CERTIFICATE OF CORRECTION

Patent No. 3,703,550         Dated November 21, 1972

Inventor(s) Mamoru NAKANO ET AL

It is certified that error appears in the above-identified patent and that said Letters Patent are hereby corrected as shown below:

In the Heading, insert the following:

--Claims priority, application Japan, January 31, 1967, 6244/67--

Signed and sealed this 10th day of July 1973.

(SEAL)
Attest:

EDWARD M. FLETCHER, JR.
Attesting Officer

Rene Tegtmeyer
Acting Commissioner of Patents